(12) United States Patent
Phillips (10) Patent No.: US 11,460,562 B2
(45) Date of Patent: Oct. 4, 2022

(54) METHODS TO SIMULATE CONTINUOUS WAVE LIDAR SENSORS

(71) Applicant: Siemens Industry Software Netherlands B.V., Eindhoven (NL)

(72) Inventor: Michael Phillips, The Hague (NL)

(73) Assignee: Siemens Industry Software Netherlands B.V., Eindhoven (NL)

( * ) Notice: Subject to any disclaimer, the term of this patent is extended or adjusted under 35 U.S.C. 154(b) by 0 days.

(21) Appl. No.: 17/624,685

(22) PCT Filed: Jul. 9, 2019

(86) PCT No.: PCT/EP2019/068388
§ 371 (c)(1),
(2) Date: Jan. 4, 2022

(87) PCT Pub. No.: WO2021/004626
PCT Pub. Date: Jan. 14, 2021

(65) Prior Publication Data
US 2022/0128673 A1   Apr. 28, 2022

(51) Int. Cl.
*G01S 7/497* (2006.01)
*G06F 30/20* (2020.01)
*G01S 7/491* (2020.01)

(52) U.S. Cl.
CPC .............. *G01S 7/497* (2013.01); *G01S 7/491* (2013.01); *G06F 30/20* (2020.01)

(58) Field of Classification Search
CPC .... G06F 30/20; G06F 30/367; G06F 2111/08; G01S 7/497; G01S 17/006; G01S 7/491; G06T 15/06

(Continued)

(56) References Cited

U.S. PATENT DOCUMENTS

| 4,342,514 A | 8/1982 | Mathews |
| 4,464,115 A | 8/1984 | Simpson et al. |

(Continued)

FOREIGN PATENT DOCUMENTS

| CN | 101604022 A | 12/2009 |
| CN | 102901970 A | 1/2013 |

(Continued)

OTHER PUBLICATIONS

Kim, Angela M. Simulating full-waveform LIDAR. Naval Postgraduate School Monterey CA, 2009. 1-128.

(Continued)

*Primary Examiner* — John H Le
(74) *Attorney, Agent, or Firm* — Lempia Summerfield Katz LLC (57) ABSTRACT

The disclosure relates to a method for simulating sensor data of a continuous wave (CW) Light Detection and Ranging (lidar) sensor. The method includes generating a ray set comprising at least one ray, based on a CW signal, where each ray in the ray set has an emission starting time and an emission duration. The method further includes propagating, for each ray in the ray set, the ray through a simulated scene including at least one object; computing, for each ray in the ray set, a signal contribution of the propagated ray at a detection location in the simulated scene; generating an output signal, based on mixing the CW signal with the computed signal contributions of the rays in the ray set; and at least one of storing and outputting the output signal.

16 Claims, 4 Drawing Sheets

(58) Field of Classification Search
USPC .......................................................... 703/20
See application file for complete search history.

(56) References Cited

U.S. PATENT DOCUMENTS

| | | | |
|---|---|---|---|
| 5,825,464 | A | 10/1998 | Feichtner |
| 2008/0106724 | A1 | 5/2008 | Braune et al. |
| 2009/0309780 | A1 | 12/2009 | Albert et al. |
| 2010/0259594 | A1 | 10/2010 | Johansson et al. |
| 2016/0005209 | A1 | 1/2016 | Dachsbacher |
| 2016/0210775 | A1 | 7/2016 | Alaniz et al. |
| 2017/0356983 | A1 | 12/2017 | Jeong et al. |
| 2018/0356503 | A1 | 12/2018 | Konrad |
| 2019/0154810 | A1 | 5/2019 | Tanemura et al. |
| 2019/0227175 | A1* | 7/2019 | Steinberg ................ G01S 17/93 |
| 2020/0174126 | A1* | 6/2020 | Killinger ................ G01S 17/89 |
| 2021/0025997 | A1* | 1/2021 | Rosenzweig ......... G01S 7/4868 |

FOREIGN PATENT DOCUMENTS

| | | |
|---|---|---|
| CN | 104049259 A | 9/2014 |
| CN | 104199019 A | 12/2014 |
| CN | 104268323 A | 1/2015 |
| CN | 109917402 A | 6/2019 |
| DE | 102007057372 A1 | 5/2009 |
| DE | 102016100416 A1 | 7/2016 |
| EP | 3260875 A1 | 12/2017 |
| JP | 09318732 A | 12/1997 |
| JP | 2002526843 A | 8/2002 |
| JP | 2006039704 A | 2/2006 |
| JP | 2018084545 A | 5/2018 |
| JP | 2019020368 A | 2/2019 |
| JP | 2019095218 A | 6/2019 |
| KR | 20170138648 A | 12/2017 |
| WO | 2000019379 A1 | 4/2000 |

OTHER PUBLICATIONS

Notification of Transmittal of the International Preliminary Repod on Patentability dated Aug. 20, 2021. corresponding to PCT International Application No. PCT/EP2019/068388.
PCT International Search Report and Written Opinion of International Searching Authority dated Feb. 20, 2020. corresponding to PCT International Application No. PCT/EP2019/068388.
Hashimoto Jun et al., Pulse Radar Image Simulation with Raytracing Model for Underground Objection Detection, IEICE Technical Report, Japan, The Institute of Electronics, Information and Communication Engineers (IEICE), Mar. 5, 1998, vol. 97, No. 584, pp. 95-102; with English abstract.

* cited by examiner

METHODS TO SIMULATE CONTINUOUS WAVE LIDAR SENSORS

The present patent document is a § 371 nationalization of PCT Application Serial No. PCT/EP2019/068388, filed Jul. 9, 2019, designating the United States, which is hereby incorporated by reference.

TECHNICAL FIELD

The present disclosure relates to a method for simulating sensor data of a continuous wave (CW) light detection and ranging (lidar) sensor. The disclosure further relates to a device for simulating sensor data of a CW lidar sensor.

BACKGROUND

Lidar is a laser-based technology for measuring distances to a target which may provide high-resolution three-dimensional representations of the surrounding. Lidar system service applications in automatic driver assistance systems (ADAS) provide so-called environmental models used for parking assistants, for collision warning, and for autonomous driving applications. Lidar systems are extensively used in a wide range of fields, including geodesy, seismology, airborne laser swath mapping (ALSM), and laser altimetry.

There exist different types of lidar sensors. For instance, pulsed lidar sensors emit short laser pulses and measure the time-of-flight of the laser pulse from emission to its return to the lidar sensor. The measured time-of-flight may be used to compute the distance to a reflecting target.

Another type of lidar sensors uses continuous wave (CW) signals. In this case, light is continuously emitted. The light source may be modulated by either modulating the amplitude in amplitude modulated continuous wave (AMCW) methods or by modulating the frequency in frequency modulated continuous wave (FMCW) methods. In many applications, CW methods may be used in comparison to pulsed lidar sensor methods because of the accuracy and robustness of the CW methods.

Many applications require a high accuracy of the sensor data obtained by lidar systems. Developing new lidar applications may therefore involve substantial testing of the lidar sensors, involving physical sensors. In order to reduce the production costs, there is a demand for simulation data which may reproduce as accurately as possible the output of the lidar sensors being developed. Lidar simulation data is also required in many other fields, including the development of signal processing algorithms, training neural networks, virtual validation, and the like.

Providing lidar sensor data modelling pulsed lidar sensors is discussed in A. Kim et al., "Simulating full-waveform lidar", Proc. SPIE 7684, Laser Radar Technology and Applications XV, 2010, and in A. Kim, "Simulating full-waveform LIDAR", Diss. Monterey, Calif. Naval Postgraduate School, 2009.

DE 10 2016 100416 A1 deals with testing virtual sensors in a virtual environment. This may include different sensor types, including LIDAR.

EP 3 260 875 A1 discloses an automotive testing method. The method includes an act of acquiring radar sensor data responsive to a radar excitation signal.

US 2016/005209 A1 deals with photorealistic imaging and generation of pictures with focus on lighting design.

A known method to provide lidar sensor data includes simulating ideal point clouds with a single simulated ray. The propagation of the ray is computed using ray-tracing up to the nearest intersection point with a surface, whereby only mirror-reflection is considered. Accordingly, only one distance per ray is computed. Further, multiple rays per beam may provide multiple points. In such simulations, only point data is provided as an output but no information regarding the resulting signal is generated. Real lidar sensors, in contrast, produce a time-varying electrical signal which are processed to produce points in the simulated scene. The time-varying signal includes a lot of additional information about the simulated scene, including object shape, object class, multiple reflections, and the like. Such information is inevitably lost if only point clouds are provided as an output.

In addition, the time-varying signal contains features which result from physical properties of the lidar sensor and the environment, including beam shape, object motion between beams, weather effects on the signal, and the like. These features lead to artifacts in the lidar data which must be accounted for when developing sensors and algorithms based on their outputs.

Accordingly, point clouds may be insufficient for simulating lidar sensors during development and more realistic data may be required.

SUMMARY AND DESCRIPTION

It is therefore an object of the present disclosure to provide a method and a device for providing realistic continuous wave lidar data. The scope of the present disclosure is defined solely by the appended claims and is not affected to any degree by the statements within this summary. The present embodiments may obviate one or more of the drawbacks or limitations in the related art.

According to the first aspect, a method is provided for simulating sensor data of a continuous wave (CW) light detection and ranging (lidar) sensor. According to the second aspect, a device is provided for simulating sensor data of a CW lidar sensor. According to a third aspect, a computer program product is provided. According to a fourth aspect, a non-transitory, computer-readable storage medium is provided.

According to the first aspect, a method is provided for simulating sensor data of a continuous wave (CW) light detection and ranging (lidar) sensor, wherein a ray set including at least one ray is generated based on a CW signal. Each ray in the ray set has an emission starting time and an emission duration. For each ray in the ray set, the ray is propagated through a simulated scene including at least one object. For each ray in the ray set, a signal contribution of the propagated ray is computed at a detection location in the simulated scene. An output signal is generated based on mixing the CW signal with the computed signal contributions of the rays in the ray set. The method further provides storing and/or outputting the output signal.

According to a second aspect, a device is provided for simulating sensor data of a CW lidar sensor, including a processing unit and at least one of a storing unit and an output unit. The processing unit generates a ray set including at least one ray based on a CW signal, each ray of the ray set having an emission starting time and an emission duration. The processing unit propagates, for each ray in the ray set, the ray through a simulated scene including at least one object. The processing unit computes, for each ray in the ray set, a signal contribution of the propagated ray at a detection location in the simulated scene. The processing unit further generate an output signal, based on mixing the CW signal with the computed signal contributions of the rays in the ray set. The storing unit is configured to store the output signal and the output unit is configured to output the output signal.

According to a third aspect, a computer program product including executable program code is provided, wherein the program code is configured to, when executed by a computing device, perform the method for simulating sensor data of a continuous wave sensor.

According to a fourth aspect, a non-transitory, computer-readable storage medium including executable program code is provided, wherein the program code is configured to, when executed by a computing device, perform the method for simulating sensor data of a CW lidar sensor.

The disclosure provides simulation data corresponding to full-waveform signals of CW lidar sensors. Instead of only providing "perfect" point-clouds-type representations of the simulated scene, the entire signal information is kept. Therefore, the provided sensor data which includes the output signal, also allows to determine additional information, such as object shapes and object classes, and object orientation. Moreover, the sensor data also includes artifacts which are present in real lidar data, which originate from physical properties of the lidar sensor and the environment and are absent in point-clouds-type data, such as multiple reflections of the lidar beam. Therefore, sensor development may be improved by also taking the artifacts into account.

The disclosure accurately simulates how a real CW lidar sensor works and therefore accurately recreates the output of a real CW lidar sensor. The provided high-quality data, which is both complete and accurate to the real world, may also be of high value for developing signal processing algorithms, training neural networks, virtual validation, and the like.

According to an embodiment of the method, the ray set includes exactly one ray. In certain examples, the ray set includes a plurality of rays. For instance, the ray set may include at least 2, at least 100, at least 500, or at least 1000 rays. The upper number of rays may also be restricted. For instance, the ray set may include at most 100,000, at most 10,000, at most 5000, or at most 2000 rays.

According to an embodiment of the method, each ray in the ray set includes a spatial origin in the simulated scene and an emission direction in the simulated scene. Accordingly, the rays are sampled in both space and time. Sampling in space includes determining the spatial origin and direction of emission and sampling in time includes assigning a portion of the CW signal to the ray. The emission direction may correspond to a single vector in the simulated scene, indicating in which direction the ray is emitted.

According to an embodiment of the method, propagating the ray includes determining a light path of the ray based on the spatial origin of the ray, based on the emission direction of the ray, and based on reflection of the ray on the objects in the simulated scene. Further, a throughput of the ray along the light path to the detection location is computed. Computing the signal contribution is based on the computed throughput. According to an embodiment, only a single reflection may be taken into account. Multiple reflections of the rays from the objects may also be considered. The number of reflections may be restricted, e.g., only numbers of reflections smaller than a predetermined threshold are taken into account.

According to an embodiment of the method, for each ray in the ray set, mixing the CW signal with the computed signal contribution of the ray is based on a signal offset between the signal contribution and the CW signal. The signal offset is determined based on the emission starting time of the ray and the light path of the ray.

According to an embodiment of the method, the emission direction is randomly selected for each ray. The emission direction of the rays may also be uniformly selected. The emission directions may be chosen to account for the finite extent of the laser beam emitted by the lidar sensor. Laser beams may be described by Gaussian beams having a waist w_0, but the laser beams may also have an arbitrary shape. The emission direction of the entire beam, in this case, may be described by a certain solid angle. Moreover, the emission direction of the lidar sensor may be adjustable. For instance, the lidar sensor may include a micro mirror configured to deflect the emitted laser, thereby scanning a certain spatial region.

According to a further embodiment of the method, the ray set includes a plurality of rays. The emission starting times of the rays are randomly selected. The emission times may also be selected uniformly. The emission times of the rays may be chosen such that all points in time are sufficiently sampled to produce an accurate output signal. The contributions of different rays may be weighted according to an importance sampling method. For instance, the signal contributions of the rays may be weighted with different weights.

According to an embodiment of the method, the CW signal is a frequency modulated continuous wave (FMCW) signal. The CW signal may also be an amplitude modulated continuous wave (AMCW) signal.

According to an embodiment of the method, generating a ray set includes, for each ray, assigning a portion of the CW signal to the ray. The ray corresponds to a portion of the infinite-time CW signal that begins at the emission starting time and has a length equal to the emission duration. In other words, the CW signal is an infinite-time signal, (e.g., the laser emits continuously), and each ray corresponds to a section of the CW signal in a certain time interval. The time dependence of the amplitude of the ray is equal to the time dependence of the corresponding section of the CW signal.

According to an embodiment of the method, generating the output signal includes computing, for each ray in the ray set, a mixed signal contribution obtained by mixing the CW signal with the computed signal contribution of the ray. Further, the output signal is generated by adding the mixed signal contributions of all rays in the ray set. Accordingly, the output signal is generated after mixing all signal contributions with the CW signal.

According to an embodiment of the device, the ray set includes a plurality of rays, and the processing unit is configured to determine the emission starting times of the rays in a random or uniform way.

According to an embodiment of the device, the processing unit is configured to generate the ray set by assigning, for each ray, a portion of the CW signal to the ray. The portion of the CW signal assigned to the ray starts at the emission starting time and extends for the emission duration.

According to an embodiment of the device, the processing unit is configured to generate the output signal by computing, for each ray in the ray set, a mixed signal contribution by mixing the CW signal with the computed signal contribution of the ray, and by generating the output signal by adding the mixed signal contributions of all rays in the ray set.

The computing device as well as some or all components of the system may include hardware and software components. The hardware components may include at least one of microcontrollers, central processing units (CPU), graphics processing unit (GPU), memories, and storage devices.

The disclosure is be explained in greater detail with reference to exemplary embodiments depicted in the drawings as appended.

The accompanying drawings are included to provide a further understanding of the present disclosure and are incorporated in and constitute a part of this specification. The drawings illustrate embodiments of the present disclosure and together with the description serve to explain the principles of the disclosure.

Other embodiments of the present disclosure and many of the intended advantages of the present disclosure will be readily appreciated as they become better understood by reference to the following detailed description. It should be understood that method acts are numbered for easier reference, but the numbering of the acts does not necessarily imply the acts are being performed in that order unless explicitly or implicitly described otherwise. In particular, acts may also be performed in a different order than indicated by their numbering. Some acts may be performed simultaneously or in an overlapping manner.

DETAILED DESCRIPTION

Figure 1:
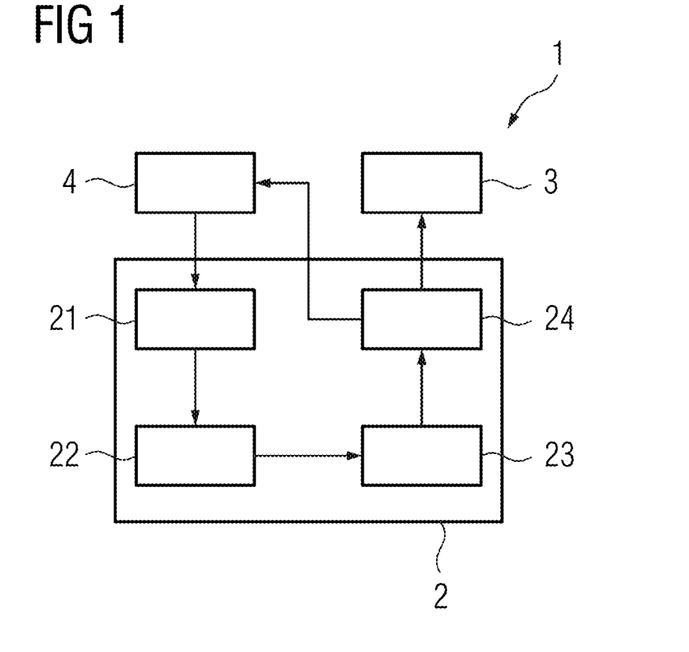
FIG. 1 schematically shows a block diagram illustrating a device for simulating sensor data of a CW lidar sensor according to an embodiment.

FIG. 1 schematically illustrates a device 1 for simulating sensor data of a CW lidar sensor. Before the different components of the device 1 are explained in more detail, the operating principle of a CW lidar sensor is described with reference to FIG. 2.

Figure 2:
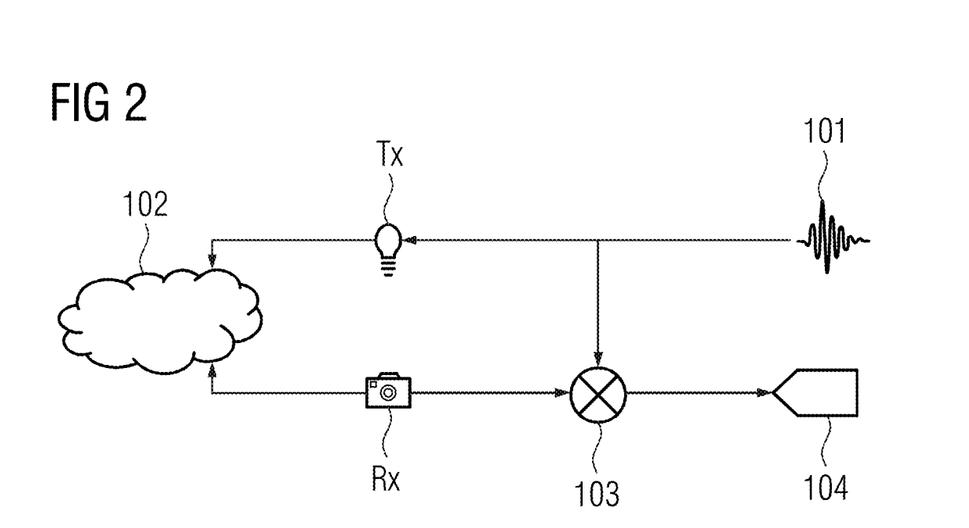
FIG. 2 schematically shows an illustration of an example of a lidar sensor during operation.

As shown in FIG. 2, a laser of the lidar sensor generates a continuous wave, CW, signal 101. The laser is controlled in such a way that the amplitude is varying as a function of time. In this case, the lidar system is arranged for an amplitude modulated continuous wave (AMCW) method. However, whereas in the following the depicted signals have varying amplitudes, the lidar system may also be configured for use with frequency modulated continuous wave (FMCW) methods. In this case, the frequency of the CW signal varies as a function of time. A transmitter Tx of the lidar system emits the CW signal. The CW signal is reflected by one or more objects in a scene 102 and is, at least partially, received by a receiver Rx of the lidar system. The received signal is mixed by a mixing unit 103 of the lidar system with the original CW signal. The signal obtained in this way is emitted as an output signal 104.

In the following, the components of the device 1 for simulating sensor data of a CW lidar sensor are described in more detail.

The device 1 includes an interface 4 which is configured to receive data from external devices and to transmit data to external devices. The interface 4 may therefore be arranged as both an input unit and an output unit and may be any kind of port or link or interface capable of communicating information to another system (e.g., WLAN, Bluetooth, ZigBee, Profibus, ETHERNET, etc.) or to a user (Display, Printer, Speaker, etc.).

The device 1 further includes a processor or processing unit 2 configured to process data received from the interface 4. The processing unit 2 may be a central processing unit (CPU), or graphics processing unit (GPU) like a microcontroller (µC), an integrated circuit (IC), an application-specific integrated circuit (ASIC), an application-specific standard product (ASSP), a digital signal processor (DSP), a field programmable gate array (FPGA), and the like.

The processing unit 2 includes a ray set generating unit 21 being in communication with the interface 4, a ray propagating unit 22 being in communication with the ray set generating unit 21, a signal contribution computing unit 23 being in communication with the ray propagating unit 22, and an output signal generating unit 24 being in communication with the signal contribution computing unit 23. The modules 21 to 24 may be part of the processing unit 2 or may be implemented on the processing unit 2 or on separate units in communicative connection with the processing unit 2.

The device 1 further includes a storing unit 3 being in communication with the signal generating unit 24. The storing unit 3 may include a data storage like a magnetic storage or memory, (e.g., a magnetic-core memory, a magnetic tape, a magnetic card, a hard disc drive, a floppy disc, or a removable storage). The storing unit 3 may include an optical storage or memory, e.g., a holographic memory, an optical tape, a Laserdisc, a Phasewriter, Phasewriter Dual (PD), a Compact Disc (CD), Digital Video Disc (DVD), high definition DVD (HD DVD), Blu-ray Disc (BD), or Ultra Density Optical (UDO). The storing unit 3 may further be a magneto-optical storage or memory, e.g., MiniDisc or Magneto-Optical Disk (MO-Disk); a volatile semiconductor or solid state memory, e.g., Random Access Memory (RAM), Dynamic RAM (DRAM), or Static RAM (SRAM); a non-volatile semiconductor/solid state memory, e.g., Read Only Memory (ROM), Programmable ROM (PROM), Erasable PROM (EPROM), Electrically EPROM (EEPROM), Flash-EEPROM, e.g., USB-Stick, Ferroelectric RAM (FRAM), Magnetoresistive RAM (MRAM), or Phase-change RAM; or a data carrier/medium.

The device 1 may receive certain input parameters via the interface 4, e.g., a waveform of a time-dependent CW signal or other parameters describing the CW signal, e.g., parameters relating to the phases or amplitudes of the CW signal. The input parameters may further include a maximum number or minimum number of rays to be generated by the ray generating unit 21. Moreover, the device 1 may receive information regarding a simulated scene, such as the number, orientation, and properties of objects in the simulated scene. The simulated scene corresponds to an artificial environment of the lidar sensor to be simulated. Laser beams emitted by the lidar sensor are reflected by objects arranged in the simulated scene.

The ray generating unit 21 is configured to generate a ray set includes at least one ray, (e.g., a plurality of rays). In the following, we describe in more detail the situation, where a plurality of rays is generated. However, the disclosure is in principle also applicable to a ray set including only one ray.

The ray generating unit 21 defines for each ray in the ray set an emission starting time, an emission duration, a spatial origin in the simulated scene, and an emission direction. All rays may be omitted from the same spatial origin. However, the spatial origin may also be different for different rays. The emission starting times may be selected randomly. Accordingly, the ray generating unit 21 may include a (pseudo-) random number generator. However, the ray generating unit 21 may also select the emission starting times according to a deterministic or predefined distribution.

The ray generating unit 21 assigns to each ray a certain section of the CW signal, the section starting at the emission starting time and extending for the emission duration.

Next, the ray propagating unit 22 propagates all the rays in the ray set through the simulated scene. The ray propagating unit 22 is configured to use ray-tracing methods known in the art.

Ray-tracing is a method to sample geometry in a virtual scene known from computer graphics. In computer graphics, ray-tracing is used to create an image by shooting rays from a camera and instantaneously accumulating light on a sensor pixel, e.g., without taking the finite propagation time into account. In contrast, ray-tracing according to the present disclosure also take account of the finite propagation time.

Each ray is propagated through the simulated scene by computing the intersections of the current ray, (e.g., the original emitted ray or the already scattered ray), with the closest object in the simulated scene and computes the parameters of reflection based on the properties of the object, using a suitable physical model. By determining the (possibly multiple) reflections for each ray, the ray propagating unit 22 computes the light path of each ray in the simulated scene. Reflection of the rays may have the additional effect that only part of the energy is received at a detection location. Therefore, the ray propagating unit 22 computes in addition to the light path itself also the throughput of the ray along the light path to the detection location.

The signal contribution computing unit 23 is configured to compute the signal contribution of each propagated ray in the ray set at a detection location in the simulated scene. The signal contribution computing unit 23 computes total lengths of the light paths of the rays from the spatial origin of the ray to the detection location. The signal contribution unit 23 further computes a travel time, (e.g., propagation time or time-of-flight), for each ray from the total length of the corresponding light path, based on the speed of light, c, as a conversion factor.

The signal contribution computing unit 23 computes the signal contribution of each ray based on the portion of the CW signal assigned to the ray, wherein the portion of the CW signal assigned to the ray is phase-shifted relative to the original CW signal according to the computed travel time of the light path corresponding to the ray. The phase shift leads to a signal offset between the signal contribution and the CW signal. Moreover, the amplitude of the signal contribution of the ray may be adjusted according to the computed throughput.

The output signal generating unit 24 computes for each ray in the ray set a mixed signal contribution by mixing the original CW signal with the computed signal contribution of the ray. The output signal generating unit 24 further generates an output signal by adding the mixed signal contributions of all rays in the ray set.

The output signal generating unit 24 may be configured to provide the output signal to a user via the interface 4. In addition, or alternatively, the output signal may be stored in the storing unit 3.

Some of the aspects of the device 1 for simulating sensor data of a CW lidar sensor will be described in more detail with reference to FIGS. 3 to 6.

Figure 3:
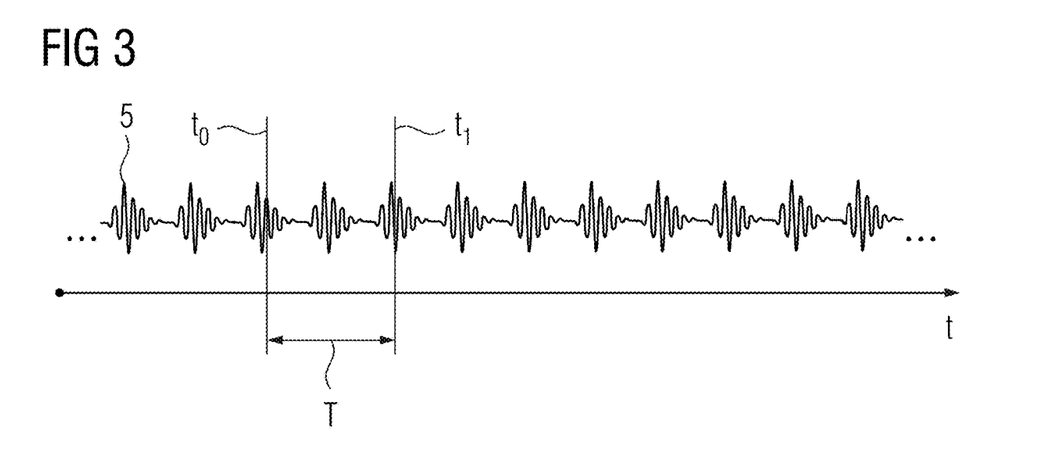
FIG. 3 schematically shows an example of a CW signal with a section assigned to a ray.

FIG. 3 shows an exemplary CW signal 5 used for generating the ray set and for generating the output signal by mixing the CW signal 5 with the computed signal contributions of the rays. As illustrated in FIG. 3, the amplitude of the CW signal is modulated, e.g., the CW signal 5 is an amplitude modulated continuous wave, AMCW, signal. According to different embodiments, the CW signal 5 may also be frequency modulated, e.g., a frequency modulated continuous wave, FMCW, signal.

For an exemplary ray in the ray set, an emission starting time $t\_0$ is set, e.g., 46 ns as measured relative to a predetermined initial time of 0 ns. Moreover, an emission duration T is set, starting from the emission starting time $t\_0$ and ending at an emission end time $t\_1$. The corresponding section or portion of the CW signal 5 between the emission starting time $t\_0$ and the emission and time $t\_1$ is assigned to the ray.

Figure 4:
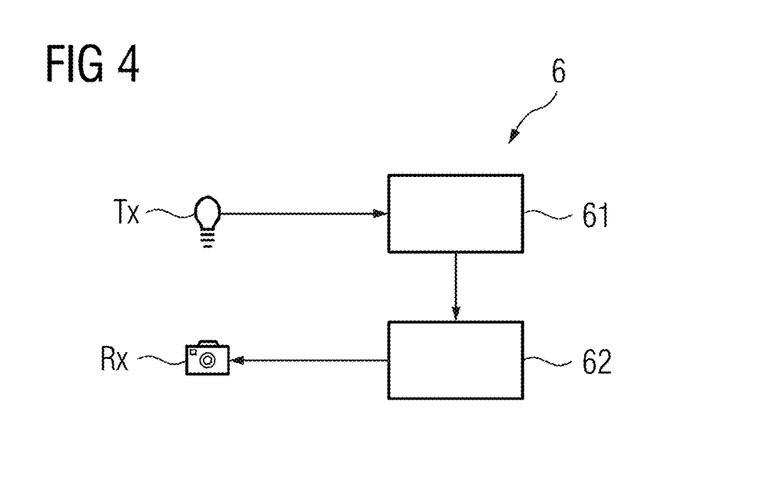
FIG. 4 schematically illustrates propagating rays from a transmitter to a receiver according to an embodiment.

As illustrated in FIG. 4, a ray may be propagated through a simulated scene, starting from a transmitter Tx of a simulated lidar sensor in the simulated scene 6, the transmitter Tx being located at the spatial origin of the ray in the simulated scene 6. The ray is reflected from a first object 61 and further reflected from a second object 62 and reaches a detection location corresponding to a receiver Rx of the simulated lidar sensor.

Figure 5:
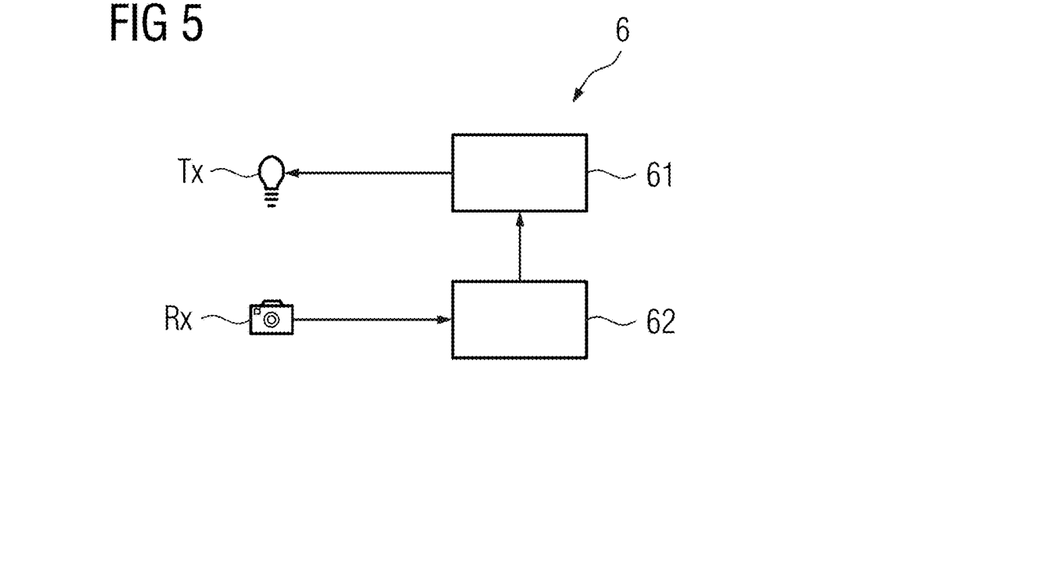
FIG. 5 schematically illustrates propagating rays from a receiver to a transmitter according to an embodiment.

As shown in FIG. 5, propagating the ray may also be performed in the reverse direction. That is, the ray may be traced from a spatial origin of the ray located at the position of the receiver Rx of the simulated lidar sensor, being at first reflected from the second object 62, then being reflected from the first object 61, until the ray reaches the detection location corresponding to the position of the transmitter Tx of the simulated lidar sensor in the simulated scene.

Figure 6:
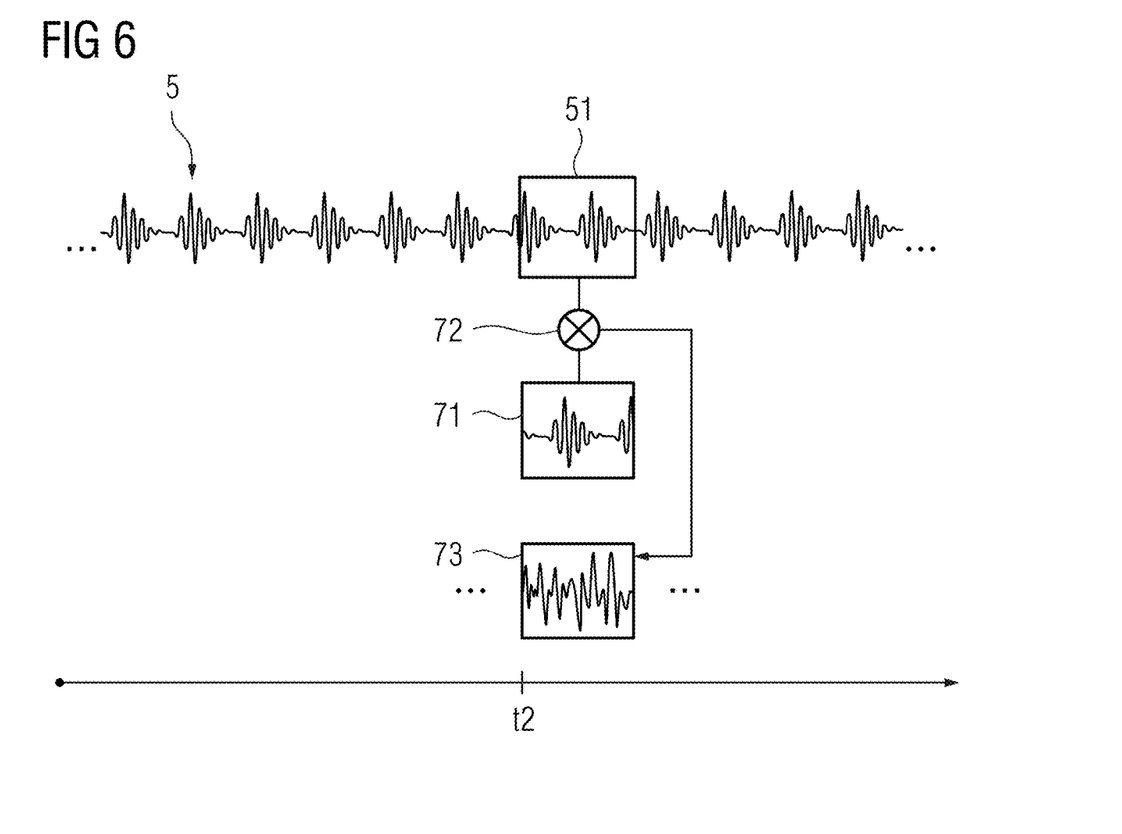
FIG. 6 schematically illustrates the generation of an output signal based on mixing the CW signal with a signal contribution of a ray according to an embodiment.

With reference to FIG. 6, the ray set generating unit 21 assigns a certain portion of the CW signal 5 to the ray, as was described above in more detail with reference to FIG. 3. After the ray propagating unit 22 propagates the ray through a simulated scene, the signal contribution computing unit 23 computes the corresponding signal contribution 71 of the ray. The output signal generating unit 24 includes a mixing unit 72 for mixing the signal contribution 71 of the ray and a portion 51 of the CW signal, starting at the time $t\_2$ the ray is received at the detection location. The time $t\_2$ corresponds to the sum of the emission starting time of the ray and the travel time of the ray. The portion 51 of the CW signal 5 may differ from the portion of the CW signal assigned to the ray (starting at the emission starting time) by a phase shift corresponding to the travel time of the ray. Moreover, the actual signal contribution of the ray may also be affected by the throughput of the ray along the light path.

By mixing the CW signal with the computed signal contribution of the ray, the output signal generating unit 24 generates a mixed signal contribution 73. For a plurality of rays in the ray set, the output signal generating unit 24 will generate the output signal by adding the mixed signal contributions 73 of all rays in the ray set.

Figure 7:
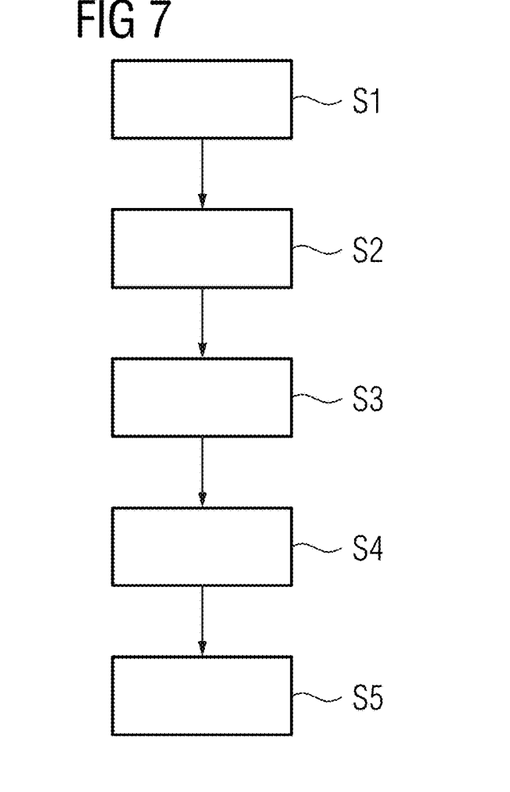
FIG. 7 shows a flow diagram of a method for simulating sensor data of a CW lidar sensor according to an embodiment.

FIG. 7 shows a flow diagram of a method for simulating sensor data of a CW lidar sensor.

In a first method act S1, a ray set is generated including at least one ray, (e.g., a plurality of rays). The number of rays in the ray set may be fixed. The number of rays in the ray set may also be randomly chosen. The number of rays in the ray set may be chosen to be larger than a predetermined minimum number. For example, the ray set may include at least 2, at least 100, at least 500, or at least 1000 rays. The number of rays in the ray set also be selected to be smaller than a predetermined maximum number. For example, the ray set may include at most 100,000, at most 10,000, at most 5000, or at most 2000 rays.

For each ray, an emission starting time is determined, relative to some predetermined time origin, (e.g., 0 ns). Moreover, an emission duration of the ray is determined. The emission duration may be equal for all rays but may also vary for different rays. The emission duration of the rays may also follow a predetermined distribution. Further, for each ray, a spatial origin in the simulated scene is determined. The spatial origin (corresponding to the emission point of the ray) may be identical for all rays in the ray set. However, different rays may also include different spatial origins. Further, an emission direction of each ray is determined.

The emission direction and/or the emission starting time and/or the emission duration may be randomly selected or may be uniformly selected or sampled. The emission starting times may be sampled in such a way that an accurate output signal is generated. In particular, the emission starting times are selected such that the portions of the CW signal assigned to the rays cover at least one entire phase of the CW signal. The contributions of respective rays may be adjusted using sampling theory, e.g., importance sampling.

In a method act S2, each ray in the ray set is propagated through a simulated scene. The simulated scene includes a plurality of objects having predetermined geometries and physical properties. The locations and/or physical properties of the objects in the simulated scene may be fixed or may change in time. Propagating the rays is performed using ray-tracing algorithms known in the art. For each ray, a light path of the ray is determined based on the spatial origin of the ray, the emission direction of the ray and the reflections of the ray on the objects in the simulated scene. Moreover, a throughput of the ray along the light path to the detection location is computed.

In a method act S3, a signal contribution of the propagated ray at a detection location in the scene is computed for each ray in the ray set. A signal contribution is computed based on the computed throughput and based on the travel time of the ray. The travel time of the ray may be computed from the length of the light path of the ray. The final travel time of the ray leads to a signal offset between the signal contribution and the CW signal. The signal offset is determined based on the emission starting time of the ray and the travel time along the light path of the ray.

In a method act S4, each computed signal contribution is mixed with the CW signal to compute a mixed signal contribution of the corresponding ray. Mixing the CW signal with the computed signal contribution is based on the signal offset. The mixed signal contributions of all rays are added to generate an output signal.

In a method act S5, the output signal is stored in a memory storing unit 3. Additionally, or alternatively, the output signal is outputted to an output unit 4, e.g., a display or printer.

Figure 8:
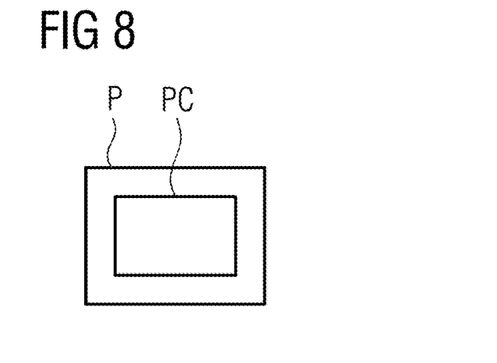
FIG. 8 schematically illustrates a block diagram illustrating a computer program product according to an embodiment.

FIG. 8 schematically illustrates a block diagram illustrating a computer program product P including executable program code PC. The executable program code PC is configured to perform, when executed (e.g., by a computing device), the method for simulating sensor data of a CW lidar sensor.

Figure 9:
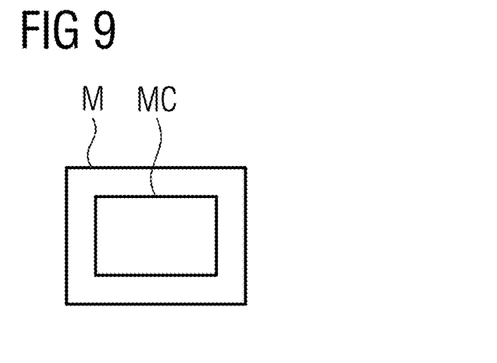
FIG. 9 schematically illustrates a block diagram illustrating a non-transitory, computer-readable storage medium according to an embodiment.

FIG. 9 schematically illustrates a block diagram illustrating a non-transitory, computer-readable storage medium M including executable program code MC configured to, when executed (e.g., by a computing device), perform the method for simulating sensor data of a CW lidar sensor.

It should be understood that all advantageous options, variance in modifications described herein and the foregoing with respect to embodiments of the device for simulating sensor data of a CW lidar sensor may be equally applied to embodiments of the method for simulating sensor data of a CW lidar sensor, and vice versa.

In the foregoing detailed description, various features are grouped together in one or more examples for the purpose of streamlining the disclosure. It is to be understood that the above description is intended to be illustrative, and not restrictive. It is intended to cover alternatives, modifications, and equivalents. Many other examples will be apparent to one skilled in the art upon reviewing the above specification.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Further, this disclosure may cover any adaptations or variations of the specific embodiments discussed herein.

Specific nomenclature used in the foregoing specification is used to provide a thorough understanding of the disclosure. However, it will be apparent to one skilled in the art in light of the specification provided herein that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed; obviously many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects. In the context of the present description and claims the conjunction "or" is to be understood as including ("and/or") and not exclusive ("either . . . or").

The invention claimed is:

1. A method for simulating sensor data of a continuous wave (CW) Light Detection and Ranging (lidar) sensor, the method comprising:

generating, by a processor, a ray set comprising at least one ray, based on a CW signal, each ray in the ray set having an emission starting time and an emission duration;

propagating, by the processor for each ray in the ray set, the ray through a simulated scene comprising at least one object;

computing, by the processor for each ray in the ray set, a signal contribution of the propagated ray at a detection location in the simulated scene;

generating, by the processor, an output signal based on mixing the CW signal with each computed signal contribution of the at least one ray in the ray set, wherein the CW signal differs from each computed signal contribution of the at least one ray in the ray set by a phase shift corresponding to a travel time of the respective ray; and outputting the output signal as sensor data to a process for developing signal processing algorithms, training a neural network, performing virtual validating, or developing a sensor.

2. The method of claim 1, wherein each ray in the ray set comprises a spatial origin in the simulated scene and an emission direction in the simulated scene.

3. The method of claim 2, wherein the propagating of the ray comprises:

determining a light path of the ray based on the spatial origin of the ray, on the emission direction of the ray and on reflection of the ray on the at least one object in the simulated scene; and computing a throughput of the ray along the light path to the detection location; and wherein the computing of the signal contribution is based on the computed throughput, and wherein the computed throughput of the ray is related to a part of energy received at the detection location due to reflection of the ray along the light path.

4. The method of claim 3, wherein, for each ray in the ray set, the mixing of the CW signal with the computed signal contribution of the ray is based on a signal offset between the signal contribution and the CW signal, and wherein the signal offset is determined based on the emission starting time of the ray and the light path of the ray.

5. The method of claim 2, wherein the emission direction is randomly selected or uniformly selected.

6. The method of claim 2, wherein, for each ray in the ray set, the mixing of the CW signal with the computed signal contribution of the ray is based on a signal offset between the signal contribution and the CW signal, and wherein the signal offset is determined based on the emission starting time of the ray and a light path of the ray.

7. The method of claim 1, wherein the ray set comprises a plurality of rays, and wherein the emission starting times of the plurality of rays are randomly selected or uniformly selected.

8. The method of claim 1, wherein the CW signal is a frequency modulated continuous wave signal or an amplitude modulated continuous wave signal.

9. The method of claim 1, wherein the generating of the ray set comprises assigning a portion of the CW signal to each ray of the at least one ray, and wherein the portion of the CW signal begins at the emission starting time and has a length equal to the emission duration.

10. The method of claim 1, wherein the generating of the output signal comprises:

computing, for each ray in the ray set, a mixed signal contribution by mixing the CW signal with the computed signal contribution of the ray; and generating the output signal by adding the mixed signal contribution of each ray in the ray set.

11. A device for simulating sensor data of a continuous wave (CW) Light Detection and Ranging (lidar) sensor, the device comprising:

a processor configured to:

generate a ray set comprising at least one ray, based on a CW signal, each ray of the ray set having an emission starting time and an emission duration, propagate, for each ray in the ray set, the ray through a simulated scene comprising at least one object, compute, for each ray in the ray set, a signal contribution of the propagated ray at a detection location in the simulated scene; and generate an output signal based on mixing the CW signal with the computed signal contribution of the at least one ray in the ray set, wherein the CW signal differs from the computed signal contributions of the at least one ray in the ray set by a phase shift corresponding to a travel time of the respective ray; and an output unit configured to output the output signal to a process for developing signal processing algorithms, training a neural network, performing virtual validating, or developing a sensor.

12. The device of claim 11, wherein the ray set comprises a plurality of rays, and wherein the processor is configured to determine the emission starting time of each ray of the plurality of rays in a random or uniform way.

13. The device of claim 11, wherein the processor is configured to generate the ray set by assigning a portion of the CW signal to each ray of the at least one ray, and wherein the portion of the CW signal begins at the emission starting time and has a length equal to the emission duration.

14. The device of claim 11, wherein the processor is configured to generate the output signal by:

computing, for each ray in the ray set, a mixed signal contribution by mixing the CW signal with the computed signal contribution of the ray; and generating the output signal by adding the mixed signal contribution of each ray in the ray set.

15. A non-transitory computer program product comprising executable program code, wherein the program code, when executed by a computing device, is configured to:

generate a ray set comprising at least one ray, based on a CW signal, each ray in the ray set having an emission starting time and an emission duration;

propagate, for each ray in the ray set, the ray through a simulated scene comprising at least one object;

compute, for each ray in the ray set, a signal contribution of the propagated ray at a detection location in the simulated scene;

generate an output signal based on mixing the CW signal with each computed signal contribution of the at least one ray in the ray set, wherein the CW signal differs from each computed signal contribution of the at least one ray in the ray set by a phase shift corresponding to a travel time of the respective ray; and output the output signal to a process for developing signal processing algorithms, training a neural network, performing virtual validating, or developing a sensor.

16. A non-transitory, computer-readable storage medium comprising executable program code, wherein the program code, when executed by a computing device, is configured to:
generate a ray set comprising at least one ray, based on a CW signal, each ray in the ray set having an emission starting time and an emission duration;
propagate, for each ray in the ray set, the ray through a simulated scene comprising at least one object;
compute, for each ray in the ray set, a signal contribution of the propagated ray at a detection location in the simulated scene;
generate an output signal, based on mixing the CW signal with each computed signal contribution of the at least one ray in the ray set, wherein the CW signal differs from each computed signal contribution of the at least one ray in the ray set by a phase shift corresponding to a travel time of the respective ray; and
output the output signal to a process for developing signal processing algorithms, training a neural network, performing virtual validating, or developing a sensor.

* * * * *